(12) United States Patent
Silitonga et al.

(10) Patent No.: US 9,281,730 B2
(45) Date of Patent: Mar. 8, 2016

(54) MOTOR DRIVING SYSTEM

(71) Applicant: NIDEC SERVO CORPORATION, Kiryu, Gumma (JP)

(72) Inventors: Charles Simson Halason Silitonga, Kiryu (JP); Toshihiro Okabe, Kiryu (JP); Akiko Soma, Kiryu (JP); Makoto Yajima, Kiryu (JP)

(73) Assignee: NIDEC SERVO CORPORATION, Gumma (JP)

( * ) Notice: Subject to any disclaimer, the term of this patent is extended or adjusted under 35 U.S.C. 154(b) by 58 days.

(21) Appl. No.: 13/949,484

(22) Filed: Jul. 24, 2013

(65) Prior Publication Data

US 2014/0042878 A1    Feb. 13, 2014

(30) Foreign Application Priority Data

Aug. 9, 2012 (JP) ................. 2012-176744

(51) Int. Cl.
*G05B 11/28* (2006.01)
*H02K 11/00* (2006.01)
*H02P 6/00* (2006.01)
*H02P 6/08* (2006.01)

(52) U.S. Cl.
CPC ............ *H02K 11/0073* (2013.01); *H02K 11/33* (2016.01); *H02P 6/001* (2013.01); *H02P 6/08* (2013.01)

(58) Field of Classification Search
CPC .... B66B 1/285; G05B 19/075; G05B 19/104; G05B 19/237; G05B 19/42
See application file for complete search history.

(56) References Cited

U.S. PATENT DOCUMENTS

| 5,483,141 | A | * | 1/1996 | Uesugi | .................. | F25B 49/025 |
| | | | | | | 318/599 |
| 7,859,210 | B2 | * | 12/2010 | Sakurai | .................... | H02M 5/00 |
| | | | | | | 318/400.26 |
| 8,274,251 | B2 | * | 9/2012 | Yoo | ..................... | A47B 88/0414 |
| | | | | | | 312/319.5 |
| 2005/0168181 | A1 | * | 8/2005 | Okumura et al. | ............. | 318/268 |
| 2008/0224643 | A1 | * | 9/2008 | Sakurai | .................... | H02M 5/00 |
| | | | | | | 318/471 |

FOREIGN PATENT DOCUMENTS

| CN | 101604945 A | 12/2009 |
| JP | 2000-041395 A | 2/2000 |
| JP | 2004-260965 A | 9/2004 |

OTHER PUBLICATIONS

Zhao, C. , "Analysis on Improvements of Triangular Wave Generator", Technology Wind, 2nd Issue, Jan. 2010, pp. 216-217.

* cited by examiner

*Primary Examiner* — Shawki S Ismail
*Assistant Examiner* — Zoheb Imtiaz
(74) *Attorney, Agent, or Firm* — Keating & Bennett, LLP (57) ABSTRACT

A motor driving system that changes a rotation speed of a motor pursuant to a speed command includes a main device including a drive circuit configured to drive the motor, an input device configured to input the speed command to the drive circuit, and a signal insulating unit configured to insulate the input device from the main device and to transmit the speed command from the input device to the drive circuit of the main device.

5 Claims, 6 Drawing Sheets

MOTOR DRIVING SYSTEM

BACKGROUND OF THE INVENTION

1. Field of the Invention

The present invention relates to a motor driving system configured to drive a motor such as a fan motor that forcibly circulates cold air in a freezing showcase or a refrigerator.

2. Description of the Related Art

In a fan motor for forcibly circulating cold air in a freezing showcase or a refrigerator, it is conventionally required to keep a rotation speed constant, to change over a rotation speed depending on the in-refrigerator situation, or to change a rotation speed pursuant to a predetermined program. The control of a rotation speed is performed by a motor driving system. From the viewpoint of electric power saving and ease of control, a brushless motor is often used as a motor to be driven by the motor driving system of this kind. In this case, some components of the motor driving system such as a rectifying circuit and a drive circuit for supplying an electric current to the brushless motor are arranged within a motor case.

In recent years, it is required for a convenience store or a supermarket to intensively or individually manage a plurality of showcases. This makes it necessary to individually control the rotation speeds of fan motors provided in the respective showcases. For that reason, the motor driving system is provided with an interface through which the rotation speeds can be controlled from the outside.

Figure 6:
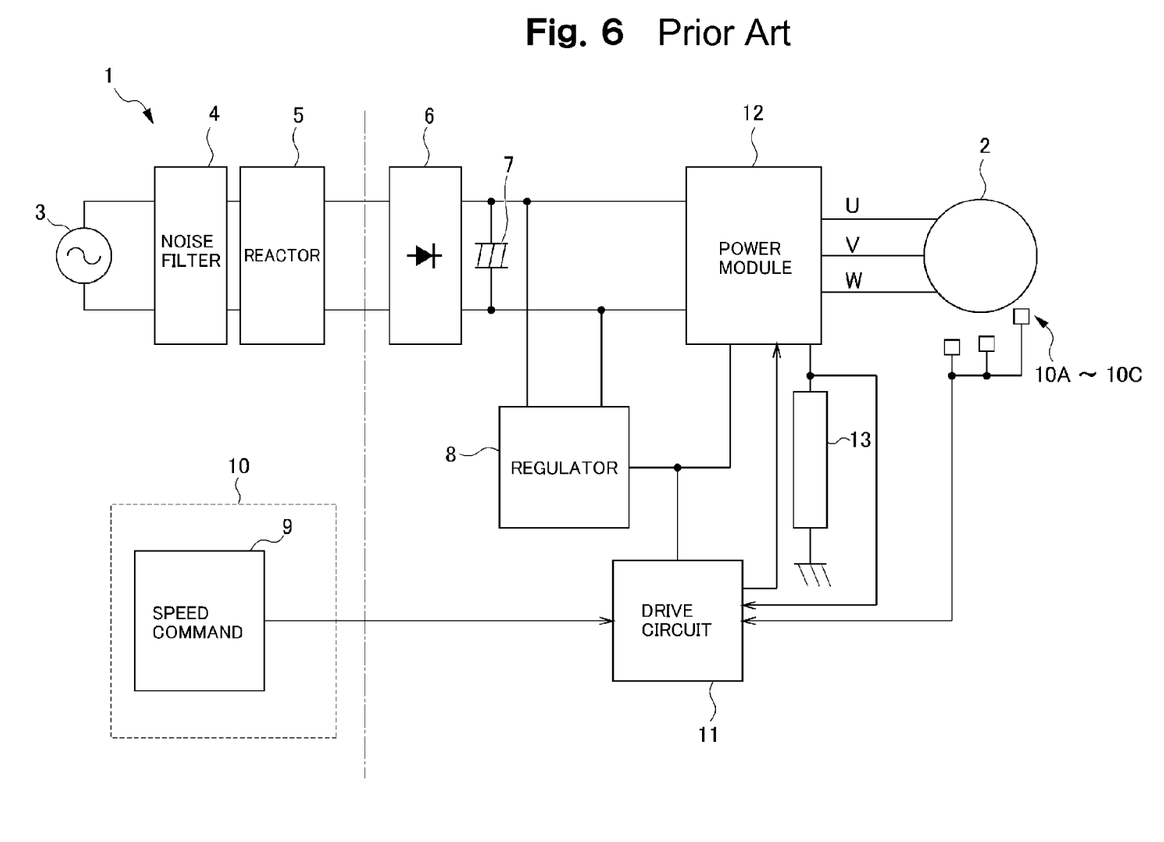
FIG. 6 is a block diagram showing a conventional motor driving system.

FIG. 6 is a block diagram showing a conventional motor driving system including an interface through which the rotation speeds can be controlled from the outside and a driving target. The driving target of the motor driving system 1 is a fan motor 2 which is a three-phase brushless motor. In the motor driving system 1, from a commercial power supply 3, AC 100 V or AC 200 V is inputted via a noise filter 4 and a reactor 5 and is rectified by a rectifying circuit 6, thereby generating a DC voltage of 140 V or 280 V. Reference symbol 7 designates a smoothing capacitor. In the motor driving system 1, a regulator 8 as a switching power supply generates an operating voltage from the DC voltage generated in the rectifying circuit 6.

In the motor driving system 1, a speed command 9 as a pulse width modulation signal is inputted from an input device 10 to a drive circuit 11. The drive circuit 11 receives output signals of hall elements 10A, 10B and 10C provided in the fan motor 2. The drive circuit 11 generates and outputs a drive signal so that the present rotation speed determined by the output signals of the hall elements 10A, 10B and 10C can become equal to the rotation speed indicated by the speed command. Responsive to the drive signal outputted from the drive circuit 11, a power module 12 outputs the DC voltage generated from the rectifying circuit 6 to the respective phases U, V, and W of the fan motor 2. Consequently, the motor driving system 1 rotationally drives the fan motor 2 at the rotation speed indicated by the speed command. In the motor driving system 1, the driving current of the fan motor 2 driven in this manner is detected by the drive circuit 11 using a terminal voltage of a current detecting element 13 formed of a resistor. The motor driving system 1 controls the drive timing of the power module 12 pursuant to the output signals of the hall elements 10A, 10B and 10C such that the driving current does not exceed a specified reference value. In the motor driving system 1 shown in FIG. 6, the rectifying circuit 6, the smoothing capacitor 7, the regulator 8, the hall elements 10A, 10B and 10C, the drive circuit 11, the power module 12 and the current detecting element 13 are arranged within a motor case.

In a case where an interface through which the rotation speeds can be controlled from the outside of the showcases is provided, it is necessary for the input device 10 associated with the interface to comply with the same safety standards as the safety standards required in the fan motor. More specifically, it is required, for a fan motor driving system connected to a commercial power supply, to comply with the safety standards such as UL (Underwriters Laboratories) and the like which are applied to the commercial power supply. Unless a measure is taken otherwise, the input device 10 associated with the speed control needs to satisfy the safety standards. Large-scale measures need to be taken against electric shocks, lightning surges, noises and so forth. As a result, there is a problem in that the configuration of the motor driving system becomes complex and troublesome.

SUMMARY OF THE INVENTION

Preferred embodiments of the present invention provide a simplified configuration of an input device associated with a speed control interface as compared with the conventional devices.

In preferred embodiments of the present invention, the configuration arranged to output a speed command is electrically insulated from a main device.

According to one preferred embodiment of the present invention, a motor driving system that changes a rotation speed of a motor pursuant to a speed command, includes a main device including a drive circuit configured to drive the motor; an input device configured to input the speed command to the drive circuit; and a signal insulating unit configured to insulate the input device from the main device and to transmit the speed command from the input device to the drive circuit of the main device.

With a preferred embodiment of the present invention, the input device arranged to input the speed command can be configured to merely comply with relaxed safety standards without having to satisfy the safety standards on a commercial power supply. This makes it possible to simplify the configuration as compared with the conventional configuration.

In the motor driving system according to a preferred embodiment of the present invention, the signal insulating unit may include a photo coupler. This makes it possible to transmit the speed command over a wide enough frequency band and to use the signal insulating unit in transmitting different types of speed commands. The speed command may be a pulse width modulation signal, and a pulse width of the pulse width modulation signal is changed depending on the speed command. This makes it possible to further simplify the configuration as compared with the conventional configuration.

The input device may include a reference signal generating circuit configured to generate a reference signal used as a reference in generation of the pulse width modulation signal and a first comparator circuit configured to generate the pulse width modulation signal by comparing a speed command voltage indicating a rotation speed with the reference signal and outputting the result of comparison. The reference signal may be a charge-discharge waveform signal whose signal level is changed at a specified frequency. The signal level may be changed more sharply at a rising time than at a falling time. This makes it possible to generate the pulse width modulation signal by maintaining the timing of one of a rising edge and a falling edge substantially constant and by changing the timing of the other of the rising edge and the falling edge.

The reference signal generating circuit may be configured to generate the reference signal by controlling a charge and discharge of a capacitor depending on an output of a second comparator circuit to which a terminal voltage of the capacitor is inputted. The input device may be configured to generate a speed command voltage by dividing the power supply voltage of the second comparator circuit. This makes it possible to generate the pulse width modulation signal without being affected by the fluctuations of a power supply voltage.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Certain preferred embodiments of the present invention will now be described with reference to the accompanying drawings.

First Preferred Embodiment

Figure 1:
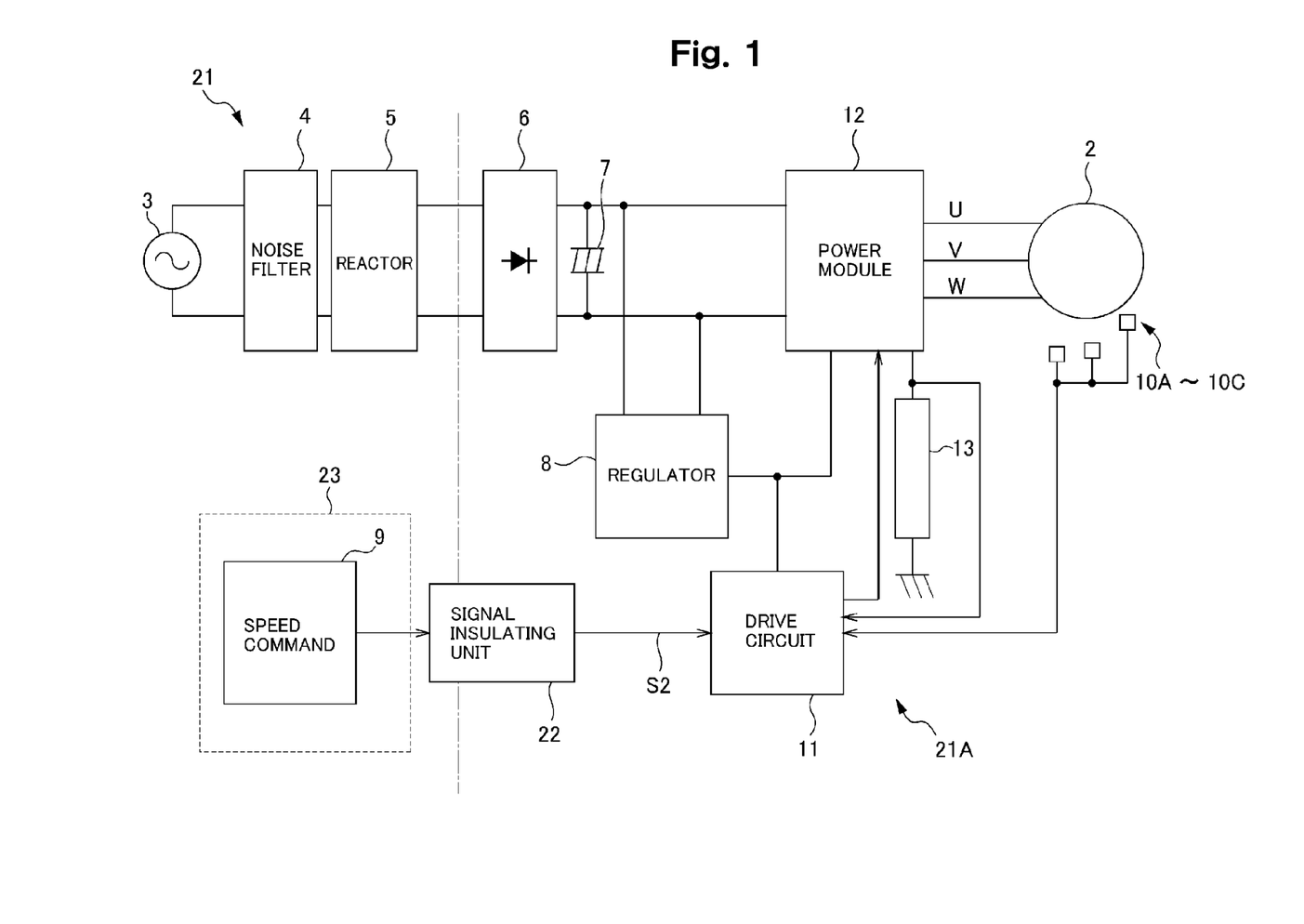
FIG. 1 is a block diagram showing a motor driving system according to a first preferred embodiment of the present invention.

FIG. 1 is a block diagram showing a motor driving system according to a first preferred embodiment of the present invention, which is compared with FIG. 6 described above. The motor driving system 21 includes a main device 21A and an input device 23. The main device 21A preferably includes a drive circuit 11, a power module 12, a current detecting element 13, a rectifying circuit 6, a smoothing capacitor 7, and a regulator 8. The drive circuit 11 is configured to drive a fan motor 2. In this motor driving system 21, a signal insulating unit 22 is preferably provided at a position between the input device 23 and the drive circuit 11. In other words, the signal insulating unit 23 is configured to insulate the input device 23 from the main device 21A. The input device 23 is preferably operated by a power supply of Class II (Class II refers to power supplies with either a double or reinforced insulation barrier between the input and the output.), e.g., a battery, and is provided with a configuration associated with the signal insulating unit 22.

In this regard, the signal insulating unit 22 is configured to transmit a speed command 9 from the input device 23 to the drive circuit 11 of the main device 21A while maintaining sufficient insulation between the input device 23 and the main device 21A. The signal insulating unit 22 is preferably provided by, e.g., a photo coupler. The motor driving system 21 of the present preferred embodiment preferably has a similar configuration as the motor driving system 1 described earlier with reference to FIG. 6 with some differences, such as, for example, the signal insulating unit 22 and its associated configuration. In the motor driving system 21, due to the use of the configuration associated with the signal insulating unit 22, the input device 23 arranged to input a speed command 9, which serves as an interface which indicates a motor rotation speed, can be configured to merely comply with relaxed safety standards without having to satisfy the safety standards on a commercial power supply. This makes it possible to simplify the configuration as compared with the conventional configuration.

Figure 2:
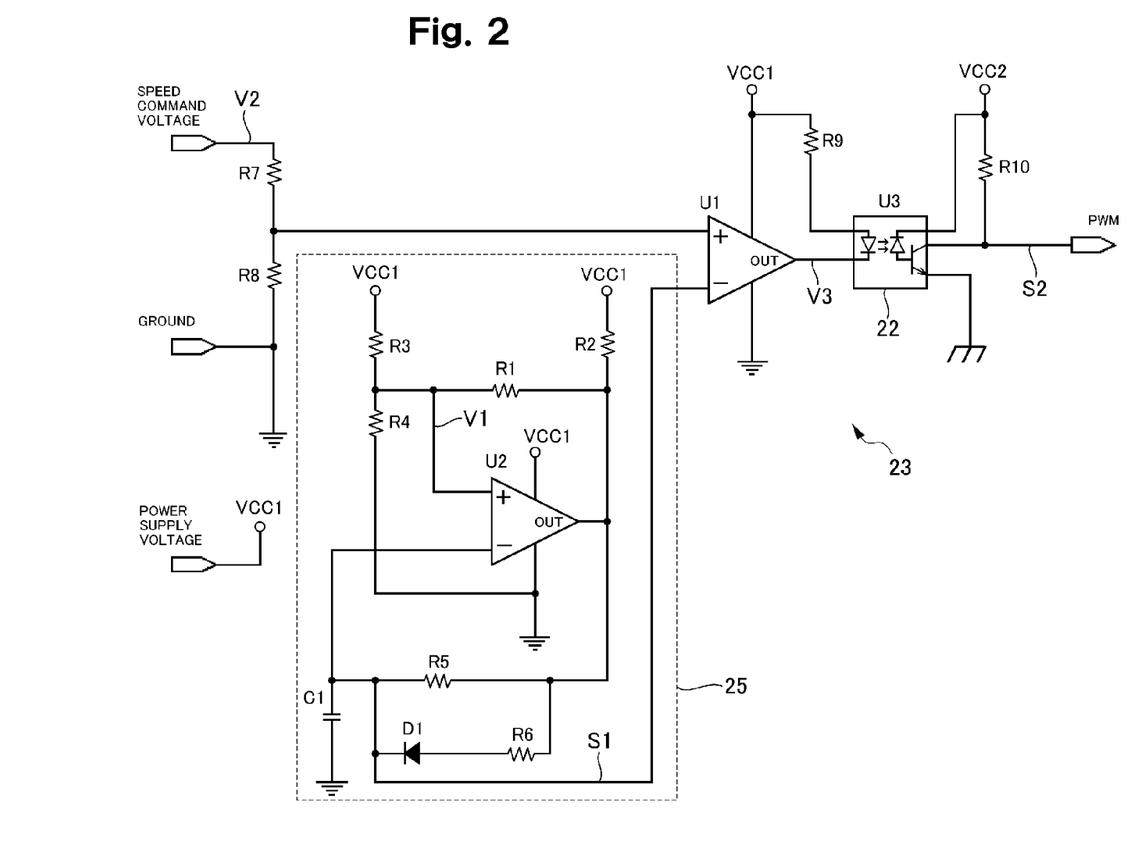
FIG. 2 is a connection diagram showing an input device included in the motor driving system shown in FIG. 1.

FIG. 2 is a block diagram showing a configuration associated with the input device 23. The input device 23 preferably includes a reference signal generating circuit 25 configured to generate a reference signal used as a reference in generation of the pulse width modulation signal and a first comparator circuit U1 configured to generate the pulse width modulation signal by comparing a speed command voltage indicating a rotation speed with the reference signal and outputting the result of comparison. In the input device 23, the reference signal generating circuit 25 generates a reference signal S1 which is needed to generate a pulse width modulation signal. In this regard, the reference signal S1 may be a signal of triangular waveform or saw-tooth waveform whose signal level is changed at a specified frequency. In the present preferred embodiment, a charge-discharge waveform signal having a rising time constant far smaller than a falling time constant is used as the reference signal S1.

More specifically, in the reference signal generating circuit 25, an output terminal of the comparator circuit U2 is grounded via a serial circuit of a resistor R5 and a capacitor C1. A serial circuit of a diode D1 and a resistor R6 is connected to the resistor R5 in parallel. The anode of the diode D1 connected to the capacitor C1. In the reference signal generating circuit 25, if an output terminal voltage of the comparator circuit U2 rises, a terminal voltage of the capacitor C1 is increased with a small time constant by the parallel circuit of the resistors R5 and R6. On the contrary, if the output terminal voltage of the comparator circuit U2 falls, the terminal voltage of the capacitor C1 is decreased with a time constant by the resistor R5 alone, which is larger than the time constant by the parallel circuit of the resistors R5 and R6 at the rising time.

The terminal voltage of the capacitor C1 is inputted to an inverting input terminal of the comparator circuit U2. If the terminal voltage of the capacitor C1 becomes higher than a voltage of a non-inverting input terminal of the comparator circuit U2, the output terminal voltage of the comparator circuit U2 is decreased. The terminal voltage of the capacitor C1 is gradually decreased along with the decrease of the output terminal voltage of the comparator circuit U2. If the terminal voltage of the capacitor C1 becomes lower than the voltage of the non-inverting input terminal of the comparator circuit U2, the output terminal voltage of the comparator circuit U2 is increased and the terminal voltage of the capacitor C1 is increased. At this time, a reference voltage obtained by dividing a power supply voltage VCC1 in a serial circuit of a resistor R3 and a resistor R4 is inputted to the non-inverting input terminal of the comparator circuit U2. The non-inverting input terminal is connected to the power supply voltage VCC1 via a serial circuit of a resistor R1 and a resistor R2. The output terminal of the comparator circuit U2 is connected to a connection point of the resistor R1 and the resistor R2. Thus, the comparator circuit U2 switches the voltage of the non-inverting input terminal by increasing or decreasing the output terminal voltage, so as to secure a hysteresis characteristic of the reference signal S1.

Figure 3:
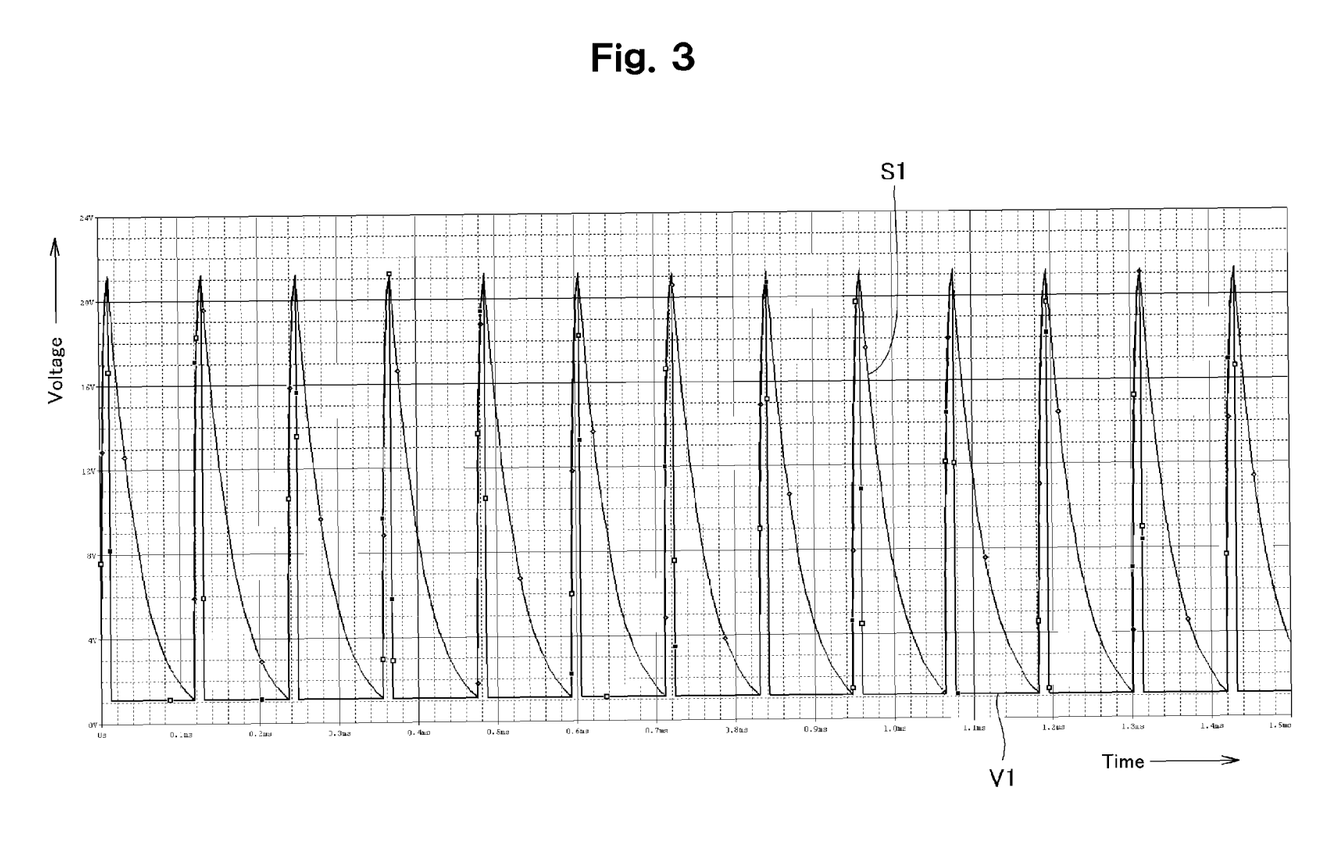
FIG. 3 is a signal waveform diagram explaining a reference signal in accordance with a preferred embodiment of the present invention.

FIG. 3 is a signal waveform diagram showing the relationship between a terminal voltage S1 of the capacitor C1 and a voltage V1 of the non-inverting input terminal. In this regard, it is assumed that the resistance values of the resistors R3 and R4 are R3 and R4, the parallel resistance value of the resistors R1 and R4 is R14, and the parallel resistance value of the resistors R1 and R3 is R13. If the output terminal voltage of the comparator circuit U2 falls, the voltage V1 of the non-inverting input terminal becomes equal to VCC1×{R14/(R14+R3)}. In contrast, if the output terminal voltage of the comparator circuit U2 rises, the voltage V1 of the non-inverting input terminal becomes equal to VCC1×{R4/(R4+R13)}. This makes it possible to secure the hysteresis characteristic and to generate a charge-discharge waveform terminal voltage S1.

Figure 4:
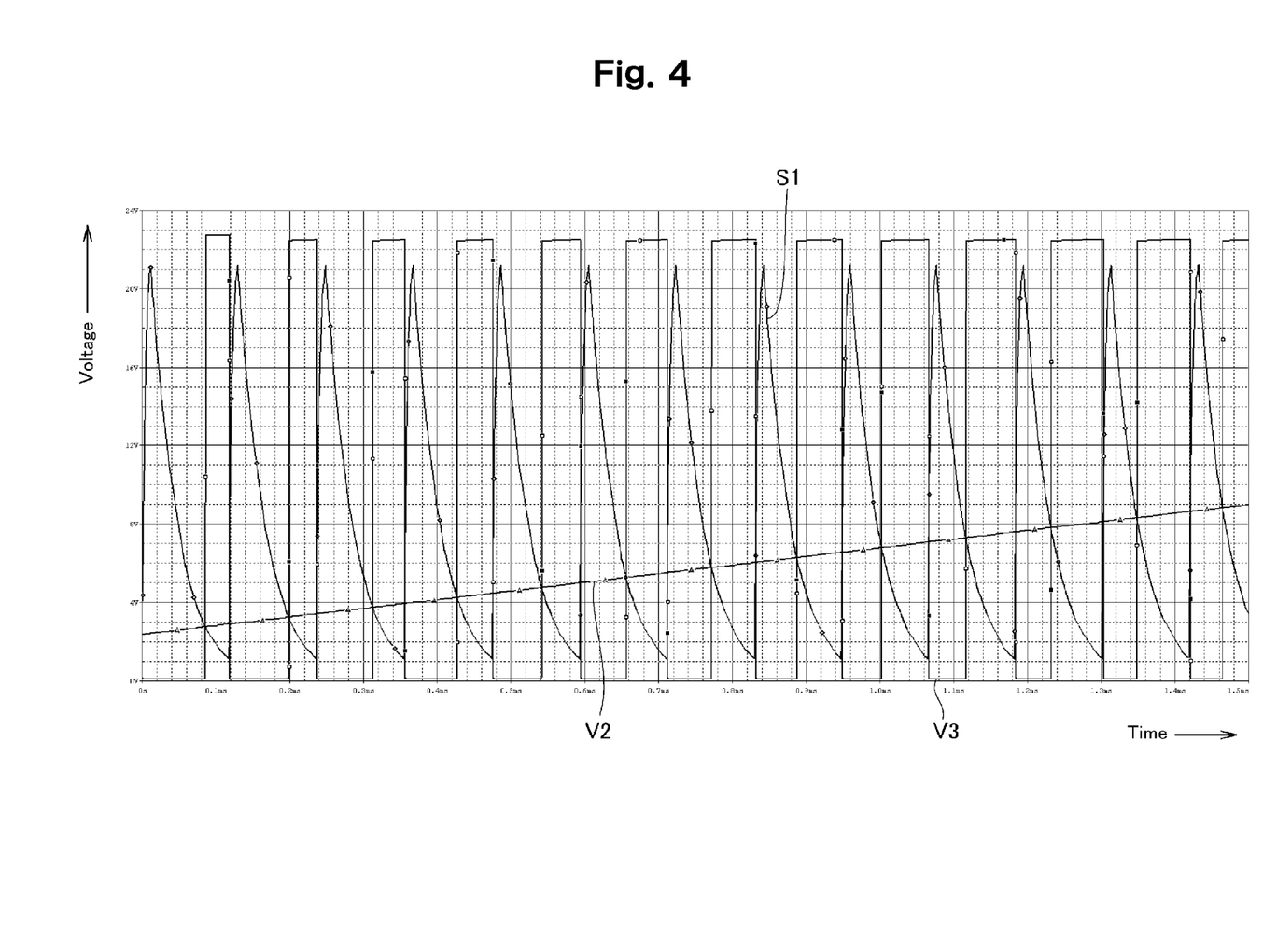
FIG. 4 is a signal waveform diagram for explaining a pulse width modulation signal in accordance with a preferred embodiment of the present invention.

In the input device 23, the terminal voltage S1 of the capacitor C1 as the reference signal S1 is inputted to an inverting input terminal of the comparator circuit U1. A speed command voltage V2 is divided by a dividing circuit preferably defined by a resistor R7 and a resistor R8 and is inputted to a non-inverting input terminal of the comparator circuit U1. In the present preferred embodiment, the speed command voltage V2 is preferably generated by dividing a power supply voltage VCC1 associated with a charge-discharge control of the reference signal generating circuit 25 by a user-operated variable resistor. Accordingly, the speed command voltage V2 is generated so as to accurately track the voltage fluctuations of the power supply voltage VCC1 of the reference signal generating circuit 25. Thus, as shown in FIG. 4, the input device 23 generates a pulse width modulation signal V3 having a regular frequency and a pulse width varying with the speed command voltage V2.

Figure 5:
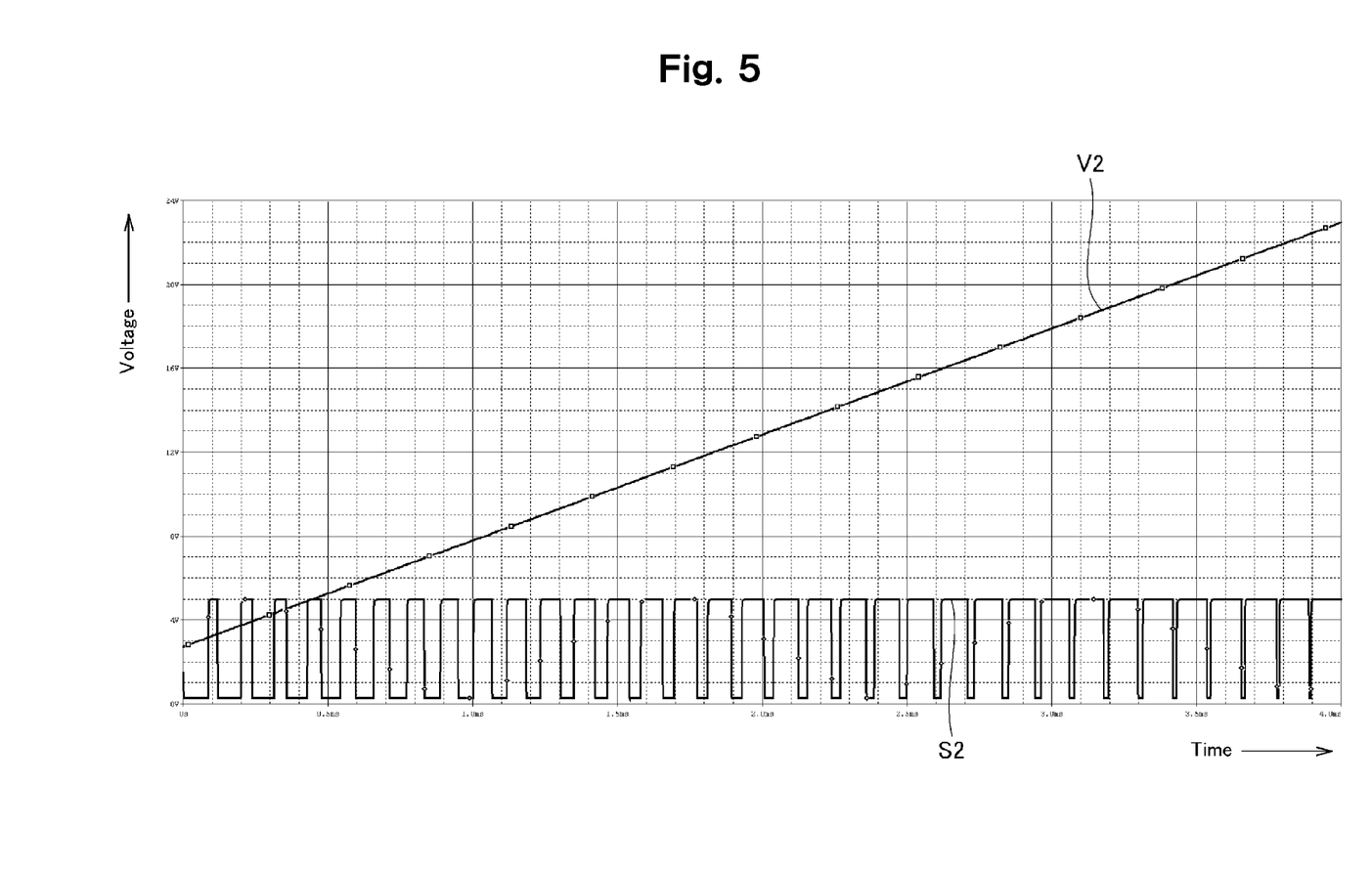
FIG. 5 is a signal waveform diagram showing the relationship between a speed command voltage and a pulse width modulation signal in accordance with a preferred embodiment of the present invention.

In the signal insulating unit 22, the light emitting diode of a photo coupler U3 is connected to the power supply VCC1 via a resistor R9. The anode of the light emitting diode is connected to an output terminal of the comparator circuit U1. An output voltage obtained at a light receiving element of the photo coupler U3 is outputted as the speed command. The light receiving element of the photo coupler U3 is provided by a photo transistor. The collector of the photo transistor is preferably connected to the power supply VCC2 via a resistor R10. FIG. 5 is a view showing the relationship between a pulse width modulation signal S2 outputted from the photo coupler U3 and the speed command voltage V2. Referring to FIG. 5, it can be noted that, even if insulation is made by the photo coupler U3, the pulse width modulation signal as the speed command can be outputted without any problem.

According to the present preferred embodiment, the speed command is transmitted from the input device 23 to the main device 21A while maintaining sufficient insulation between the input device 23 and the main device 21A through the use of the signal insulating unit 22. Therefore, the input device 23 arranged to input the speed command can be configured to merely comply with relaxed safety standards without having to satisfy the safety standards on a commercial power supply. This makes it possible to simplify the configuration as compared with the conventional configuration.

Since the signal insulating unit 22 is defined by the photo coupler U3, it is possible for the signal insulating unit to secure a wide enough frequency band. Thus, the signal insulating unit 22 can be widely used in transmitting different types of speed commands.

The speed command may be a pulse width modulation signal whose pulse width is changed depending on the rotation speed of the motor. This makes it possible to simplify the configuration as compared with the conventional configuration. At this time, there is generated the reference signal having a charge-discharge waveform whose signal level is changed more sharply at the rising time than at the falling time. If a pulse width modulation signal is generated using the reference signal, it is possible to generate the pulse width modulation signal by keeping the timing of one of a rising edge and a falling edge substantially constant and changing the timing of the other of the rising edge and the falling edge. Accordingly, at the side where the motor speed is controlled by the pulse width modulation signal, it is possible to control the motor speed by relying on only the timing of the other of the rising edge and the falling edge. This makes it possible to simplify the configuration.

In addition, the reference signal is generated by the charge-discharge control of the comparator circuit U2. The power supply voltage VCC1 associated with the charge-discharge control of the comparator circuit U2 is divided by the variable resistor, so as to generate the speed command voltage. This makes it possible to generate the speed command voltage so as to accurately tract the voltage fluctuations of the power supply voltage VCC1. Accordingly, even if amplitude of the reference signal S1 is changed due to the fluctuations of the power supply voltage VCC1, the speed command S2 provided by the pulse width modulation signal is not affected by the fluctuations of the power supply voltage VCC1. This makes it possible to accurately control a rotation speed of the fan motor 2.

Other Preferred Embodiments

While one preferred embodiment of the present invention has been described above, the configuration of the foregoing preferred embodiment may be modified in many different forms without departing from the spirit and scope of the present invention. For example, while the signal insulating unit is preferably provided by a photo coupler in the aforementioned preferred embodiment, the present invention is not limited thereto. As another example of a preferred embodiment of the present invention, the signal insulating unit may be provided by an insulating transformer.

While the speed command is transmitted through the use of a pulse width modulation signal in the aforementioned preferred embodiment, the preferred embodiments of the present invention are not limited thereto. For instance, the present invention may also be applied to an application where the speed command is transmitted through the use of a frequency modulation signal or many other signals.

While a three-phase brushless motor is used as the fan motor in the aforementioned preferred embodiment, the preferred embodiments of the present invention are not limited thereto. Alternatively, the present invention may be applied to an application where different kinds of motors are driven by the present motor driving system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor driving system that changes a rotation speed of a motor pursuant to a speed command, comprising: a main device including a drive circuit configured to drive the motor; an input device configured to input the speed command to the drive circuit; and a signal insulator configured to insulate the input device from the main device and to transmit the speed command from the input device to the drive circuit of the main device; wherein a ground connected to the input device is different from a ground connected to the signal insulator; wherein the speed command is a pulse width modulation signal that has a pulse width that is changed depending on the rotation speed of the motor; wherein the input device includes a reference signal generating circuit configured to generate a reference signal used as a reference in generation of the pulse width modulation signal and a first comparator circuit configured to generate the pulse width modulation signal by comparing a speed command voltage indicating a rotation speed with the reference signal and outputting the result of comparison, the reference signal being a charge-discharge waveform signal whose signal level is changed at a specified frequency, the signal level being changed more sharply at a rising time than at a falling time.

2. The system of claim 1, wherein the signal insulator includes a photo coupler.

3. A motor driving system that changes a rotation speed of a motor pursuant to a speed command, comprising:
   a main device including a drive circuit configured to drive the motor;
   an input device configured to input the speed command to the drive circuit; and
   a signal insulator configured to insulate the input device from the main device and to transmit the speed command from the input device to the drive circuit of the main device; wherein
   the speed command is a pulse width modulation signal that has a pulse width that is changed depending on the rotation speed of the motor; and
   the input device includes a reference signal generating circuit configured to generate a reference signal used as a reference in generation of the pulse width modulation signal and a first comparator circuit configured to generate the pulse width modulation signal by comparing a speed command voltage indicating a rotation speed with the reference signal and outputting the result of comparison, the reference signal being a charge-discharge waveform signal whose signal level is changed at a specified frequency, the signal level being changed more sharply at a rising time than at a falling time.

4. The system of claim 3, wherein the reference signal generating circuit is configured to generate the reference signal by controlling charge and discharge of a capacitor depending on an output of a second comparator circuit to which a terminal voltage of the capacitor is inputted, the input device being configured to generate a speed command voltage by dividing the power supply voltage of the second comparator circuit.

5. A motor driving system that changes a rotation speed of a motor pursuant to a speed command, comprising:
   a main device including a drive circuit configured to drive the motor; an input device configured to input the speed command to the drive circuit; and a signal insulator configured to insulate the input device from the main device and to transmit the speed command from the input device to the drive circuit of the main device; wherein an electrical power supply connected to the input device is different from an electrical power supply connected to the signal insulator; wherein the speed command is a pulse width modulation signal that has a pulse width that is changed depending on the rotation speed of the motor; wherein the input device includes a reference signal generating circuit configured to generate a reference signal used as a reference in generation of the pulse width modulation signal and a first comparator circuit configured to generate the pulse width modulation signal by comparing a speed command voltage indicating a rotation speed with the reference signal and outputting the result of comparison, the reference signal being a charge-discharge waveform signal whose signal level is changed at a specified frequency, the signal level being changed more sharply at a rising time than at a falling time.

* * * * *